(12) United States Patent
Yang et al.

(10) Patent No.: US 9,775,461 B2
(45) Date of Patent: Oct. 3, 2017

(54) COOKING DEVICE AND METHOD OF CONTROLLING THE SAME

(71) Applicant: LG ELECTRONICS INC., Seoul (KR)

(72) Inventors: Jaekyung Yang, Seoul (KR); Youngmin Lee, Seoul (KR); Eunkyoung Yoon, Seoul (KR); Jinyul Hu, Seoul (KR); Heungsik Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 217 days.

(21) Appl. No.: 14/192,199

(22) Filed: Feb. 27, 2014

(65) Prior Publication Data
US 2014/0242227 A1    Aug. 28, 2014

(30) Foreign Application Priority Data
Feb. 27, 2013  (KR) .................. 10-2013-0021021

(51) Int. Cl.
| | |
|---|---|
| *A47J 27/00* | (2006.01) |
| *F24B 1/00* | (2006.01) |
| *A47J 27/62* | (2006.01) |
| *A47J 37/06* | (2006.01) |
| *A23L 5/10* | (2016.01) |

(52) U.S. Cl.
CPC ............... *A47J 27/62* (2013.01); *A23L 5/15* (2016.08); *A47J 37/0629* (2013.01)

(58) Field of Classification Search
CPC .... A21B 1/00; A21B 1/06; A21B 1/14; F24B 1/00; F24B 1/02; F24B 1/20; A47J 27/00

USPC ....... 219/391, 393, 395, 396, 397, 398, 402, 219/406, 407, 408, 409, 410, 411, 412, 219/413, 414; 99/325–335
See application file for complete search history.

(56) References Cited

U.S. PATENT DOCUMENTS

| | | | | | |
|---|---|---|---|---|---|
| 4,874,928 | A | * | 10/1989 | Kasai ............................ | 219/492 |
| 5,512,736 | A | * | 4/1996 | Kang et al. ................... | 219/750 |
| 7,189,947 | B2 | * | 3/2007 | Fulton ..................... | F24C 7/087 |
| | | | | | 219/412 |
| 2002/0092844 | A1 | * | 7/2002 | Horn et al. .................... | 219/506 |
| 2004/0245245 | A1 | * | 12/2004 | Shon et al. ................... | 219/708 |
| 2006/0016801 | A1 | * | 1/2006 | Kitabayashi et al. ........ | 219/497 |
| 2006/0151486 | A1 | * | 7/2006 | Jung ............................. | 219/708 |
| 2009/0008379 | A1 | * | 1/2009 | Ingemanson ................. | 219/395 |
| 2009/0134141 | A1 | * | 5/2009 | Crosta et al. ................. | 219/401 |
| 2009/0204241 | A1 | * | 8/2009 | Suetsugu ........................ | 700/90 |
| 2009/0321427 | A1 | * | 12/2009 | Hyde et al. ................... | 219/702 |

(Continued)

FOREIGN PATENT DOCUMENTS

EP            0497546       *  8/1992

*Primary Examiner* — Michael Laflame, Jr.
(74) *Attorney, Agent, or Firm* — KED & Associates, LLP

(57) ABSTRACT

A cooking device is provided. The cooking device may include a cavity forming a space in which food may be received for cooking, a grill heater provided at one side of the cavity and having a plurality of heaters to heat the food, a food sensing device provided in the cavity to acquire information related to a size of the food received in the cavity, and a main controller to estimate the size of the food using information sensed by the food sensing device. The main controller may then operate a part or all of the plurality of heaters according to the estimated size of the food to perform a grill cooking operation.

3 Claims, 5 Drawing Sheets

(56) References Cited

U.S. PATENT DOCUMENTS

2009/0321428 A1* 12/2009 Hyde et al. .................. 219/702
2010/0018961 A1*  1/2010 Roh et al. ................. 219/447.1
2010/0133263 A1*  6/2010 Toyoda et al. ............... 219/681
2011/0168689 A1*  7/2011 Kuenen ........................ 219/392

* cited by examiner

COOKING DEVICE AND METHOD OF CONTROLLING THE SAME

CROSS-REFERENCE TO RELATED APPLICATION(S)

This application claims priority under 35 U.S.C. §119 to Korean Application No. 10-2013-0021021 filed in Korea on Feb. 27, 2013, whose entire disclosure is hereby incorporated by reference.

BACKGROUND

1. Field

This relates to a cooking device and method of controlling the same.

2. Background

A cooking device may accommodate an article such as food in a space formed by a cavity, and may heat the article using various heating sources to perform cooking. The heating sources may include, for example, a heater, a magnetron, and the like, and heat or microwaves generated by the heater or the magnetron transfers energy such as convection, radiation, and the like to the article to perform cooking.

The heating sources may include a grill heater having a dual structure for heating a wide range and generating a relatively large amount of heat energy. Components of such a grill heater may be controlled to perform a cooking method irrespective of a size of the article received in the cooking device, thus possibly consuming unnecessary energy.

BRIEF DESCRIPTION OF THE DRAWINGS

The embodiments will be described in detail with reference to the following drawings in which like reference numerals refer to like elements wherein.

DETAILED DESCRIPTION

Reference will now be made in detail to various embodiments, examples of which are illustrated in the accompanying drawings.

In the following detailed description, reference is made to the accompanying drawings that form a part hereof, and in which is shown by way of illustration various exemplary embodiments. These embodiments are described in sufficient detail to enable those skilled in the art, and it is understood that other embodiments may be utilized and that logical structural, mechanical, electrical, and chemical changes may be made without departing from the spirit or scope as broadly described herein. To avoid detail not necessary to enable those skilled in the art, the description may omit certain information known to those skilled in the art. The following detailed description is, therefore, not to be taken in a limiting sense.

Figure 1:
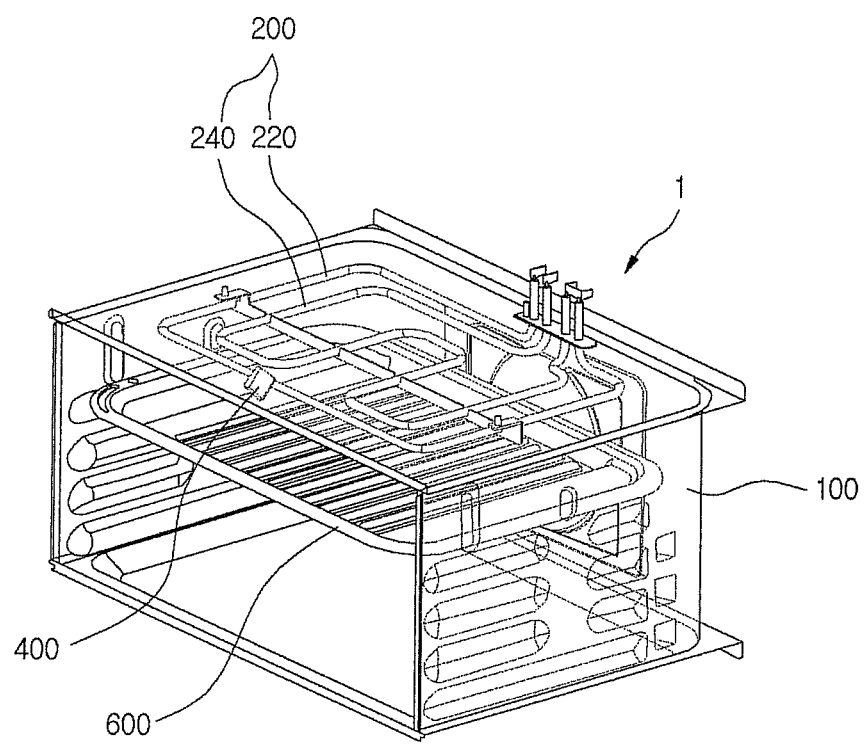
FIG. 1 is a perspective view of a cooking device including a grill heater, according to an embodiment as broadly described herein.

Referring to FIG. 1, a cooking device 1 as embodied and broadly described herein may include a cavity 100 with a grill heater 200, or heating element 200, provided at a top portion thereof to heat food received in the cavity 100. A grill pan 600 may be provided below the grill heater 200 in the cavity 100 to receive the food to be cooked. The grill pan 600 is held in a groove or bump formed inside the cavity 100 and then may be slidably withdrawn and replaced.

The grill heater 200 may include an outer heater 220, or outer heating element 220, and an inner heater 240, or inner heating element 240, positioned inside the outer heater 220. In certain embodiments, the outer heater 220 and inner heater 240 may be disposed at a top surface of the cavity 100 by fixing members, and may be separated from the top surface of the cavity 100. Each of the outer heater 220 and inner heater 240 may be bent one or more times.

Figure 4:
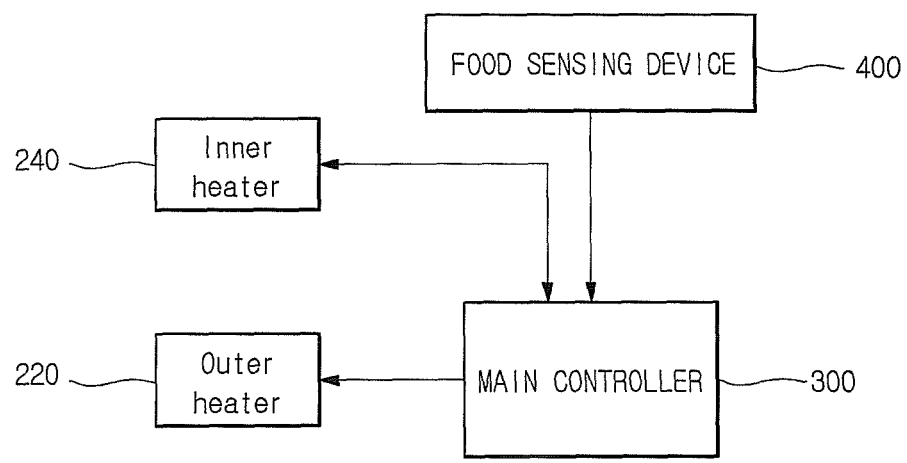
FIG. 4 is a block diagram of control components of the cooking device shown in FIG. 1, according to an embodiment as broadly described herein.

A food sensing device 400 may be provided at the top of the cavity 100 to acquire information used to determine a size of food received in the cavity 100 for cooking. The food sensing device 400 senses a temperature of the article to be heated by the grill heater 200 and ambient temperature (for example, the temperature of the grill pan 600) using, for example, a non-contact type temperature sensor. For example, the food sensing device 400 may include a non-contact type infrared light sensor. The food sensing device 400 transfers the sensed information to a main controller 300 (refer to FIG. 4), and the transferred information may be used to control the grill heater 200.

The food sensing device 400 may be provided at a center of a forward side of the grill heater 200, and may be oriented such that a sensing direction faces the article received on the grill pan 600.

The food sensing device 400 senses a change in temperature based on emissivity of the objects measured, and the main controller 300 may estimate the size of the article based on the sensed temperature change. The food sensing device 400 may be disposed above the grill pan 600 in the cavity 100.

Figure 2A:
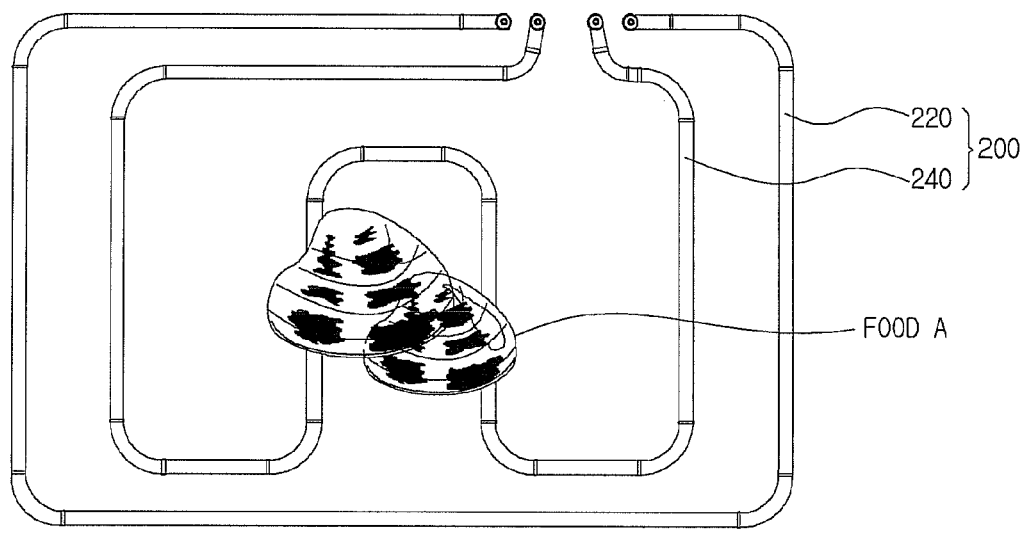
FIGS. 2A and 2B, and FIGS. 3A and 3B illustrate a process for estimating a size of an article received in a cavity of the cooking device shown in FIG. 1.
Figure 2B:
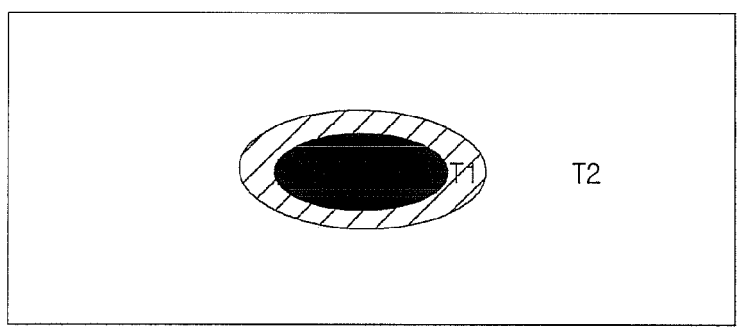

FIG. 2A illustrates a food A having a relatively small size received in the cavity 100 of the cooking device 1, at a position corresponding to a central portion of the grill heater 200. FIG. 2B illustrates a shape for sensing the temperature of the food A by the food sensing device 400, with the temperature T1 for the food A and the temperature T2 for the area surrounding the food A, that is, the grill pan 600 being sensed as different colors when the grill heater 200 operates. That is, the cooking device 1 receives the food A inside cavity 100 and then operates the grill heater 200 (both of the outer heater 220 and inner heater 240 are simultaneously operated), and senses the temperatures T1 and T2 using the food sensing device 400.

Figure 3A:
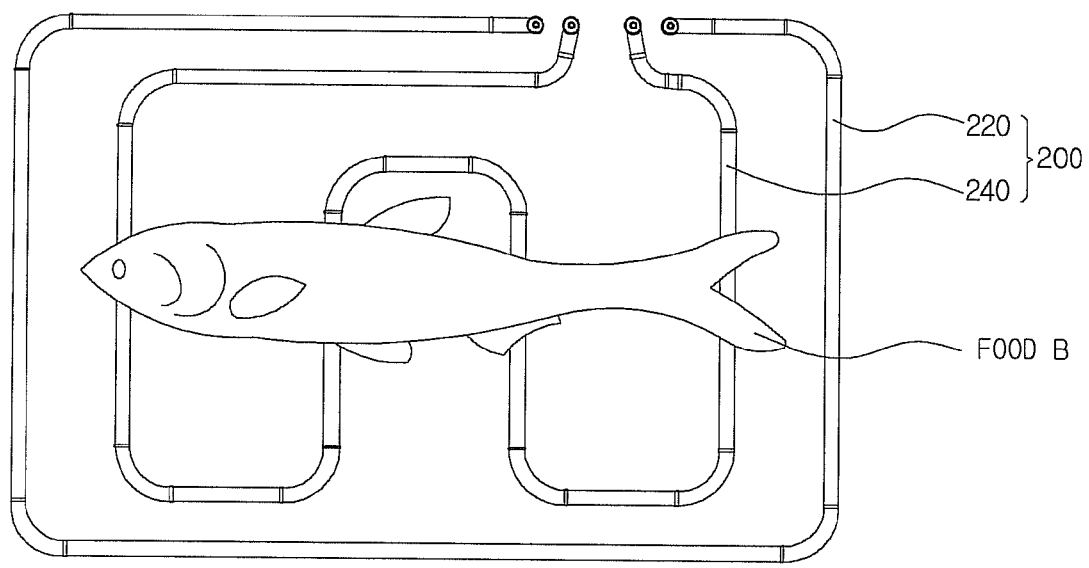
Figure 3B:
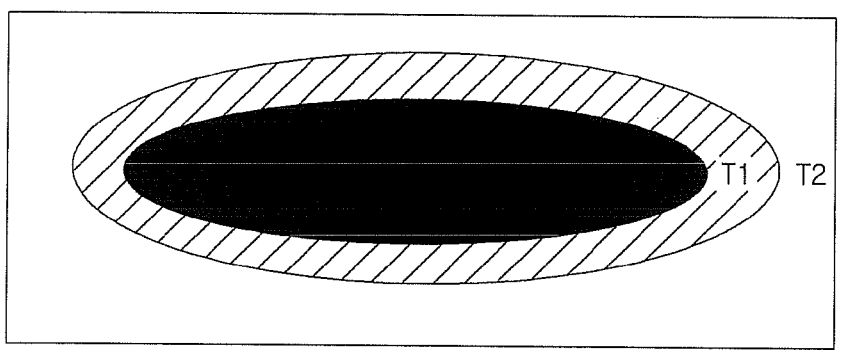

When the grill heater 200 operates, the food A has a relatively low temperature distribution, and the area surrounding the food A, that is, the top surface of the grill pan 600 on which food A is not received, has a relatively high temperature distribution due to direct radiation receipt of the grill heater 200. Therefore, when a relatively large food B is accommodated inside the cavity 100 as shown in FIG. 3A, a region having temperature T1 for the food B is larger than a region having temperature T2 for the grill pan 600 as shown in FIG. 3B.

When differences in the size of the food are subjected to heating by the same grill heater 200, a relatively large food B is slowly heated as compared with a small food A. Thus, a small article such as the food A is rapidly heated as compared with the food B. The cooking device 1 as embodied and broadly described herein estimates the size of the food using the difference in the temperatures.

Figure 5:
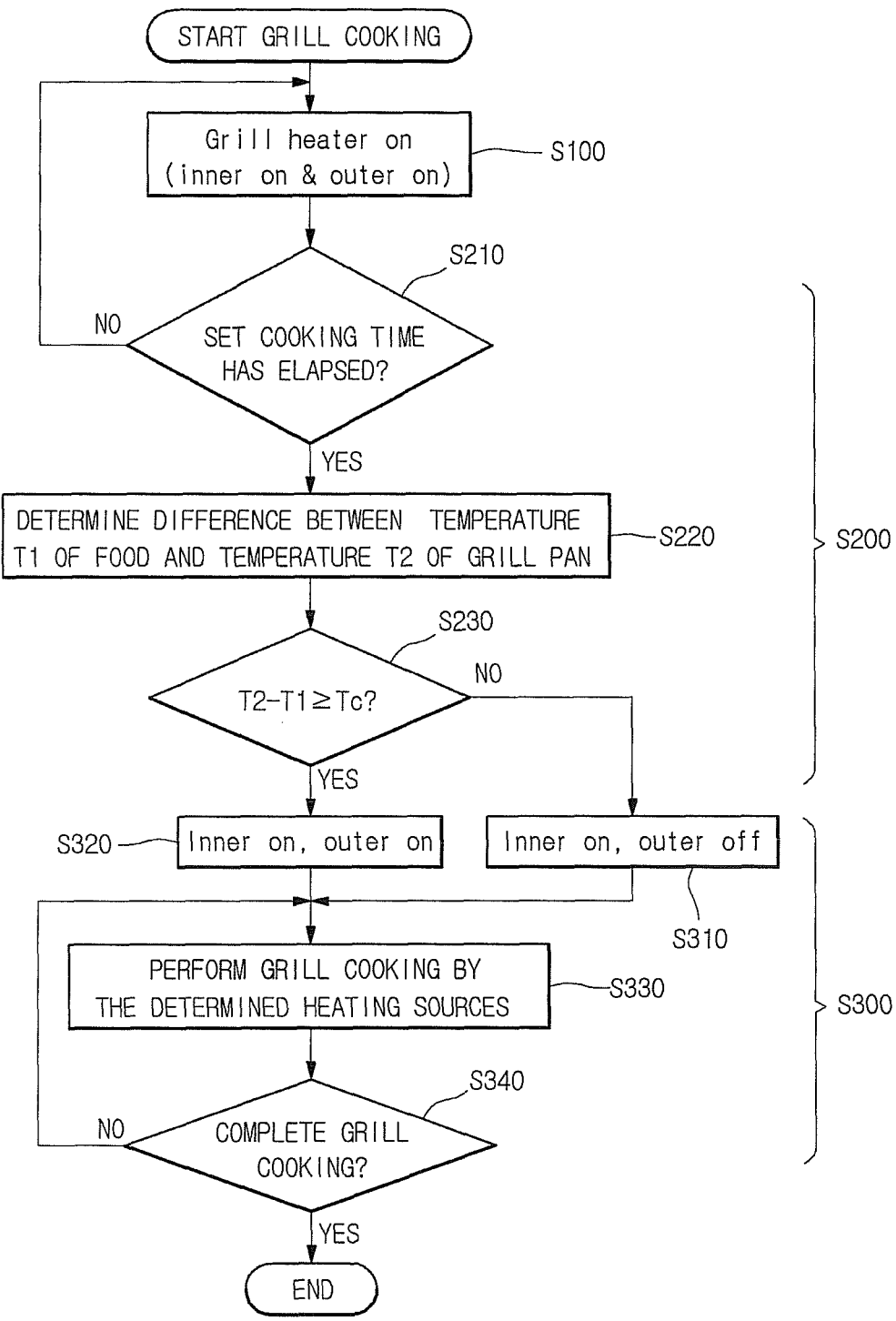
FIG. 5 is a flow chart of a process for controlling the cooking device shown in FIG. 1, according to an embodiment as broadly described herein.

FIG. 5 is a flow chart of a process for controlling the cooking device according to an embodiment as broadly described herein.

Referring to FIG. 5, when a cooking object, that is, food is accommodated inside the cavity 100, an initial heating step S100 is performed, in which both of the outer heater 220 and the inner heater 240 are operated. That is, both of the outer heater 220 and inner heater 240 are operated to rapidly heat the inside of the cavity 100 at the initial heating step S100.

Then, a food size estimating step S200 is performed, in which it is determined whether a set cooking time t0 has elapsed 210, a difference between the temperature T1 of the food and the temperature T2 of the grill pan 600 is determined S220, and it is determined whether the difference between the temperatures T1 and T2 is greater than a setting temperature Tc.

The food sensing device 400 senses the temperature T2 of the area surrounding the heated food, that is, the grill pan 600, and the temperature T1 of the heated food after the set cooking time t0 has elapsed, and the sensed results are transferred to the main controller 300, at the food size estimating step S200.

The main controller 300 subtracts the temperature T1 of the food from the temperature T2 of the grill pan 600 and compares the temperature difference with the setting temperature Tc.

The selling temperature Tc may be statistically determined using based on values subtracting the sensed temperature T1 for the food from the temperature T2 for the grill pan 600 in the case of heating a relatively large food B as shown in FIGS. 3A and 3B, and subtracting the sensed temperature T1 of the food from the temperature T2 of the grill pan 600 in the case of heating a relatively small food A as shown in FIGS. 2A and 2B.

That is, the value subtracting the temperature T1 for the food from the temperature T2 for the grill pan 600 may be relatively high when heating a relatively large food. On the contrary, the value subtracting the temperature T1 for the food from the temperature T2 for the grill fan 600 may be very low due to rapid heating by both of the outer heater 220 and the inner heater 240 when heating a relatively small food.

Therefore, the setting temperature Tc may be determined between temperature values calculated in the case of accommodating a relatively small food and calculated in the case of accommodating a relatively large food, and may be stored into the main controller 300 or a memory.

In certain embodiments, sensing the size of the food accommodated inside the cavity 100 is regarded as a relatively small food in the case that all the food items are received in a heating range downwardly vertical to the inner heater 240, and regarded as a relatively large food in the case in which the food items exceed a heating range downwardly vertical to the inner heater 240, thereby to form statistical criteria and determine the selling temperature Tc.

Therefore, the setting temperature Tc determined as above is compared to the difference determined by subtracting the temperature T1 for the food from the temperature T2 for the grill pan 600, to thereby determine the size of the accommodated food as relatively large in the case that the resulting value is larger than the selling temperature Tc, and to determine the size of the accommodated food as relatively small in the case that the resulting value is less than the setting temperature Tc, at the food size estimating step S200.

After the size of the food is determined by the food size estimating step S200 as above, a selective heating step S300 may be performed for determining which heater will heat the food S310 and S320, and performing a selected cooking operation until completion S330 and S340.

In particular, the inner heater 240 and outer heater 220 may be turned on when the size of the food is relatively big S320. On the contrary, when the size of the food is relatively small, the inner heater 240 is turned on and the outer heater 220 is turned off S310. Therefore, since some heaters of the grill heaters are turned off in a case in which a small food article is to be cooked, unnecessary heaters may be turned off to reduce power consumption.

Two grill heaters are provided in the above-described embodiment, but the grill heater may include at least three heaters. Even in this case, a size of the food may be estimated based on information sensed by the food sensing device when all of the at least three heaters are turned on, to determine which of the heaters should be turned off, and to turn off the determined heaters.

As another example, the food sensing device may be a temperature sensor in the above-described embodiment, but it is possible that the food sensing device may also be a camera.

In this case, the camera may capture an image of a part or all of the food and grill heater. The main controller estimates the size of the food based on relative positions of the food and grill heater based on the image captured by the camera, and may control the grill heater based on the estimated size of the food. When comparing the estimated size of the food with a criterion size, the main controller consistently turns on the grill heater in the case that the estimated size of the food is larger than the criterion size, and turns off the outer heater configuring the grill heater in the case that the estimated size of the food is less than the criterion size.

According to an embodiment as broadly described herein, a size of an article accommodated inside the cavity may be automatically sensed, operation or not of a plurality of heaters may be determined according to the sensed size, and a heating/cooking operation may be performed while reducing unnecessary energy consumption.

Embodiments provide a cooking device and method of controlling the same.

A cooking device in accordance with an embodiment as broadly described herein may include a cavity to form an accommodating space for food, a grill heater, having a plurality of heaters, to heat the food at one side of the cavity, a food sensing device to acquire information sensing the size of the food accommodated into the cavity, and a main controller to estimate the size of the food using information sensed by the food sensing device, to operate a part or all of the plurality of heaters according to the estimated size for the food, and to perform a grill cooking.

A method of controlling a cooking device in accordance with an embodiment as broadly described herein may include heating food accommodated inside a cavity, when all of a plurality of heaters is turned on, on inputting a cooking order, sensing temperatures for the food and the surrounding of the food heated by the plurality of heaters by a temperature sensor when the plurality of heaters are turned on and a setting time is lapsed, and comparing the difference between the temperatures for the surrounding of the food and the food sensed from the temperature sensor with the setting temperature and determining heaters to be turned off of the plurality of heaters.

According to another embodiment, a method of controlling a cooking device may include heating food accommodated inside a cavity, when a plurality of heaters is turned on, on inputting a cooking order; taking food and a part or all of a plurality of heaters by a food sensing device when the plurality of heaters are turned on and a setting time is lapsed; and estimating the size of the food based on an image taken from the food sensing device and determining heaters to be turned off of the plurality of heaters.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A cooking device, comprising:
    a cavity forming space configured to receive food for cooking;
    a heater provided at one side of the cavity, the heater including a plurality of heating elements;
    a sensing device provided in the cavity, wherein the sensing device includes a non-contact type IR sensor arranged to sense a temperature of the food and a temperature of a support; and
    a controller configured to estimate the size of the food based on both the temperature of the food and temperature of the support sensed by the sensing device, and to operate one or more of the plurality of heating elements based on the estimated size of the food to perform a cooking operation, wherein the controller is configured to initially turn on all of the plurality of heating elements, and wherein the controller is programmed to turn off at least one of the plurality of heating elements when the difference between the temperature of the support and the temperature of the food is less than a prescribed difference.

2. The cooking device of claim 1, wherein the controller is configured to maintain the on-state of the plurality of heating elements when the difference between the temperature of the support and the temperature of the food is greater than or equal to the prescribed difference.

3. The cooking device of claim 1, wherein the plurality of heating elements includes an outer heating element and an inner heating element positioned within a periphery of the outer heating element, wherein the controller is configured to turn off the outer heating element when the difference between the temperature of the support and the temperature of the food is less than the prescribed difference.

* * * * *